March 10, 1953

T. W. PAUL 2,630,870

LOAD CARRYING AUXILIARY FRAME STRUCTURE FOR
ATTACHMENT TO TRACTORS AND LIKE VEHICLES

Filed July 18, 1949

INVENTOR.
T. W. PAUL

BY R C Johnson

ATTORNEYS

March 10, 1953 — T. W. PAUL — 2,630,870
LOAD CARRYING AUXILIARY FRAME STRUCTURE FOR
ATTACHMENT TO TRACTORS AND LIKE VEHICLES
Filed July 18, 1949 — 3 Sheets-Sheet 2

INVENTOR.
T. W. PAUL
BY
ATTORNEYS

March 10, 1953 — T. W. PAUL — 2,630,870
LOAD CARRYING AUXILIARY FRAME STRUCTURE FOR ATTACHMENT TO TRACTORS AND LIKE VEHICLES
Filed July 18, 1949 — 3 Sheets-Sheet 3

INVENTOR.
T. W. PAUL
BY
ATTORNEYS

Patented Mar. 10, 1953

2,630,870

UNITED STATES PATENT OFFICE 2,630,870

LOAD CARRYING AUXILIARY FRAME STRUCTURE FOR ATTACHMENT TO TRACTORS AND LIKE VEHICLES

Talbert W. Paul, Moline, Ill., assignor to Deere & Company, Moline, Ill., a corporation of Illinois Application July 18, 1949, Serial No. 105,286

14 Claims. (Cl. 180—14)

This invention relates to secondary or auxiliary frame structure for attachment to tractors or like vehicles. More particularly, the invention relates to a frame adapted to carry a harvesting unit and associated components in side-by-side relationship with a conventional agricultural tractor or similar vehicle.

The conventional agricultural tractor, although designed for use with a variety of machinery and implements, is not primarily designed for the superimposition thereon of relatively heavy or bulky machinery or implements. An example of such machine is the cotton picker.

The cotton picker currently developed and found to be most satisfactory under all conditions includes a relatively large picking unit having picking drums rotatable about parallel vertical axes for picking cotton from the plants, and in addition includes doffing mechanism also rotatable about parallel vertical axes for removing the picked cotton from the picking spindles of the drum. The picker has conveying means, ordinarily of the pneumatic type, for conveying the picked and doffed cotton to a receptacle which, according to a preferred design, is carried by the same vehicle that carries the picking unit. The entire arrangement must be such that it can be readily propelled through the cotton field, either by a vehicle built especially for the purpose or by a tractor to which the picking machine is attached. Obviously, a picker that has its own specially built propelling unit presents problems quite different from those encountered in the design of a picking machine developed for attachment to a conventional tractor or like vehicle, for in the former case the propelling unit is initially designed to carry and propel the picker, whereas in the latter case the design of the picker must be adapted as fully as possible to the standardized design of the tractor.

On the other hand, an ordinary tractor may be adapted to carry a specially designed picker by furnishing with the picker various conversion parts the use of which in effect amounts to a complete redesign of the tractor. This is not always desirable, since it withdraws the tractor from use for other purposes. Therefore, an important factor to be considered is the adaptation of the picking machine to a standard tractor without materially modifying the design of the tractor, so that the picker may be readily removed from the tractor and the tractor used for other purposes. Obviously, of course, the picker could be built as a machine to be drawn behind the tractor. However, as in many cases of drawn implements or machines, the problem then becomes one of facility in operation, since the tractor operator is too far removed from the picker to efficiently control the latter.

According to the present invention, there is provided an auxiliary wheeled frame positionable alongside a conventional tractor or like vehicle, this frame having a single wheel disposed in transverse alinement with one of the rear traction wheels of the tractor and further having longitudinally spaced means for connection to the tractor on a generally longitudinally extending pivot axis. These mounting means are preferably located in such manner as to superimpose at least part of the load of the auxiliary frame on the tractor at such points as to equally distribute the weight of the picking machine between the tractor and the carrying wheel of the auxiliary frame. In the design of a machine of this type, adequate consideration must be given to the provision and location of load-sustaining means in relation to the basic design of the tractor. For example, rear end portions of the tractor are more suitably adapted than are the front portions of the tractor to carry superimposed loads. Further, the greater the load imposed at the forward end of the tractor, the more difficult it is to control the tractor and picker when operated as a unit. Another factor to be considered is the general stability of the tractor as such, wherefore it becomes important in the provision of the auxiliary frame to locate the various components of the picker, or other harvesting unit, at such points as to improve, if possible, the stability characteristics of the tractor, and particularly the stability characteristics of the machine as a whole. Along with this consideration, there are those that involve the arrangement of the picking machine components in such manner that there is caused little, if any, alteration in the tractor, to the end that the picker may be readily attached to and detached from the tractor so that the tractor may be used for other purposes.

The invention further contemplates the provision of a novel auxiliary frame structure which is specially designed to accommodate the attachment thereto of the picker and associated components and the attachment thereof to a tractor of one well-known type. Further objects of the invention are to provide a frame that is simple and durable in construction; to achieve an auxiliary frame which has three load-sustaining elements arranged respectively at the apices of a triangle (as viewed from above), one of these load-sustaining elements comprising a carrying wheel or equivalent ground-engaging support for the auxiliary frame, and the other two load-sustaining elements constituting the mounting means for connecting the frame to the tractor. A still further object is to arrange the mounting means on the tractor in such position that the forward mounting means is located relatively close to the longitudinal center line of the tractor, whereas the rear mounting means is located intermediate the tractor center line and the rear traction wheel at one side of the tractor, thus providing for the support of the frame on those portions of the tractor best adapted to carry the superimposed load.

It is an important object of the invention to arrange the mounting means so that they lie on a generally horizontal line that is non-parallel to the longitudinal center line of the tractor, thereby accommodating the laterally off-set locations of the front and rear mounting means. In this respect, it is an important object to provide a drive shaft for the picker which is rotatable on a longitudinal axis intersecting the line of the pivot at a point cut by a transverse erect plane passing through the rearwardly projecting portion of a longitudinally extending power take-off shaft on the tractor, whereby a pair of sprockets or pulleys may be interconnected by a chain or belt lying in this plane, so that relative articulation between the tractor and the carrying frame about the aforesaid pivot may occur without varying the tension in the chain or belt.

Further objects of the invention reside in the arrangement of various components of the frame that facilitate mounting of the frame on and dismounting of the frame from the tractor, having specific reference to shiftably mounted parts that may be retracted or moved out of normal positions so that the mounting and dismounting of the frame and tractor may be accomplished by driving the tractor forwardly into or reversely out of the frame.

The foregoing and other important objects and desirable features inherent in and encompassed by the invention will become apparent to those versed in the art as a preferred form of the invention is fully disclosed in the following detailed description and accompanying sheets of drawings in which.

IN GENERAL

Briefly, and specifically, the harvesting unit disclosed comprises a tractor T alongside of which is disposed a lateral extension structure in the form of an auxiliary wheeled frame F. This frame is connected to the tractor by mounting means providing a generally longitudinally extending, horizontal pivot axis A—A. The frame F carries a cotton-picking unit P and a cotton-receiving receptacle or basket B. The machine is operated with the picker P traveling along a row of cotton $R^1$ and the tractor straddling two adjacent rows $R^2$ and $R^3$. In the case of the particular tractor shown, the operator's station is located at S, at the forward end of the tractor so as to afford a seat from which the operator may readily see the cotton plants entering the picker P.

The tractor is equipped with a pair of shields or guards G which run lengthwise of the tractor and which are provided for the purpose of protecting the plants in the rows $R^2$ and $R^3$ from damage by portions of the tractor which are not sufficiently high to clear the plants. Cotton picked by the picker P is conveyed therefrom to the basket B by means of a pneumatic conveying system including intake ducts D, fans or blowers V and delivery ducts $D^1$.

In the foregoing description, and in that to follow, specific references to the various structural components will be made in connection with the normal travel of the tractor, picking unit, and auxiliary frame. However, it will be obvious that the tractor and related parts may be reversed for example, or arranged otherwise than as shown. Hence, such terms as "front," "rear," etc., should be considered as relative terms and the entire disclosure should be understood as representative of a preferred form of the invention and not as excluding other forms thereof that could be readily achieved on the basis of what is disclosed.

Tractor or propelling vehicle

The tractor illustrated in the drawings will be recognized as one of conventional design and comprises a longitudinally extending, relatively narrow body 20 carried on rear ground-engaging means including a transverse rear axle structure made up of a pair of opposite, laterally outwardly extending axle housings 21 and 22. These axle housings respectively carry opposite, laterally outwardly extending driving axles 23 and 24, to which are respectively fixed traction wheels 25 and 26. These wheels are relatively widely spaced apart to straddle the two rows $R^2$ and $R^3$.

The tractor body 20 carries an engine hood and grille enclosure structure 27, ahead of which is located the operator's seat S. In the preferred construction illustrated, the seat S has been removed from a rearwardly located seat support 28 and has been installed in the place illustrated on a forward extension E of the tractor body. This extension includes an elongated attachment frame made up of a pair of longitudinal side members 29 and 30 (Figures 1 and 2) rigidly secured to opposite sides of the forward portion of the tractor body 20 by a plurality of attaching means such as cap screws 31 and 32, respectively. The extreme forward end of the extension E includes provision for the mounting thereon of ground-engaging means comprising steerable wheel means here in the form of a single wheel or truck 33 carried by a yoke 34 which in turn includes a vertical steering shaft 35 journaled in a column or casing 36. The upper portion of the column 36 carries a steering wheel 37 rotatable about a longitudinal horizontal axis and connected to the vertical steering shaft 35 by any suitable means, such as worm and gear mechanism represented generally by the numeral 38 (Figure 1).

The length of the extension E and the disposition of the steerable truck 33—34 is such as to dispose the steerable truck at a point considerably in advance of its original position on the tractor. This arrangement materially increases the wheel base of the tractor over the normal wheel base, as represented at W and W¹ in Figures 1 and 4. The dimension W represents the normal wheel base and the dimension W¹ represents the increased wheel base. The extension E is preferably constructed so that it may be readily installed at the forward end of the tractor and may readily utilize such conventional or standard parts of the tractor as the components 33, 34, 35, and 36. The steering wheel 37 may likewise be the standard steering wheel, removed from its normal position. The upper portion of the extension E may be provided as a platform 39 on which are grouped various controls for operating the tractor, the details of which form no part of the present invention.

Figure 1:
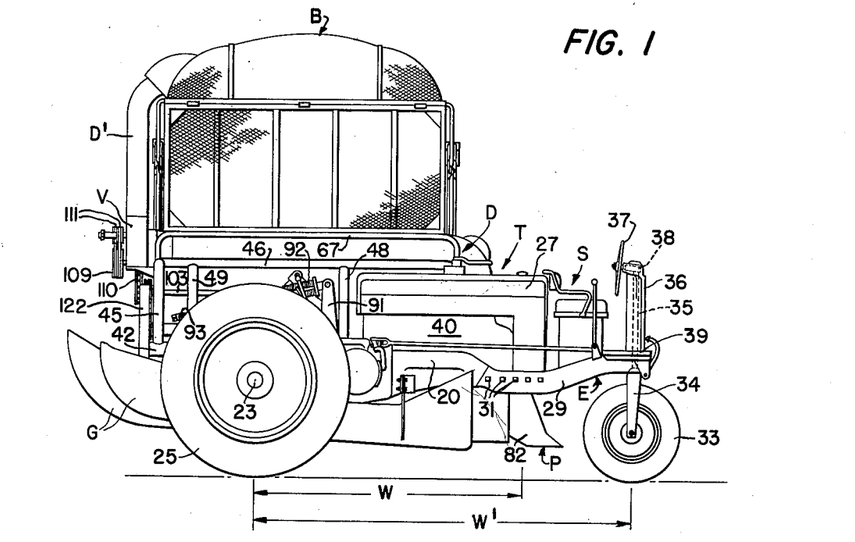
Figures 1 and 2 are respectively right-hand and left-hand side elevational views of the tractor-mounted cotton harvester.
Figure 2:
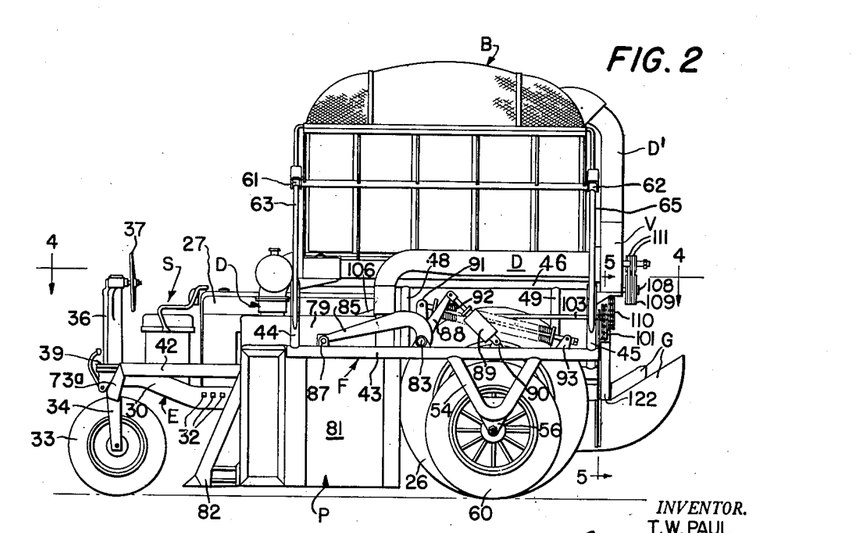

The tractor is powered by the usual internal combustion engine, designated generally at 40 (Figure 1). The rear portion of the body 20 is in the form of a transmission and final-drive housing or casing which carries the customary transmission and differential gearing (not shown) for driving the axles 23 and 24. This gearing serves also to drive a longitudinally extending power take-off shaft 41 which projects rearwardly beyond the axle structure 21—22.

*Auxiliary or secondary load-carrying frame*

Figure 9:
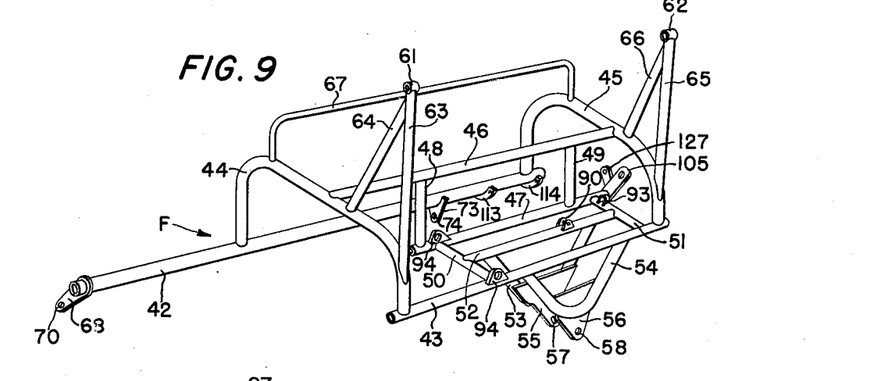
Figure 9 is a perspective view of the auxiliary frame per se.

This frame has been briefly and previously referred to as the frame F that is mounted alongside the tractor. The general structure of this frame is best shown in Figure 9. As viewed from above, the frame F is an open, generally rectangular framework made up of a longitudinally extending inner support or frame element 42, preferably of tubular construction. Spaced laterally outwardly from the member 42 is an outer or second frame element 43, which is also tubular, as are the remaining elements of the frame F. The elements 42 and 43 are parallel and the member 42 is considerably elongated forwardly over the member 43. These members are supportingly interconnected by front and rear arched cross members 44 and 45 between upper intermediate portions of which extends and is rigidly secured an intermediate longitudinal member 46. The members or elements 42—46 are rigidly interconnected by welding, as are other frame components to be presently described.

Another or intermediate longitudinal member 47 lies directly below the member 46 and midway between the members 42 and 43. The members 43 and 47 lie in a common horizontal plane. The member 47 is somewhat shorter than the member 43 and is rigidly secured to the upper longitudinal member 46 by a pair of vertical braces 48 and 49 and is rigidly secured to the outer member 43 by a pair of transverse braces 50 and 51.

A fifth, relatively short, longitudinal member 52 runs between and is rigidly secured at opposite ends respectively to the transverse braces 50 and 51. This member and the proximate portion of the member 43 serve to carry a wheel support comprising a pair of U-shaped elements 53 and 54 that lie respectively in parallel longitudinal planes through the members 52 and 43.

The supports or elements 53 and 54 respectively carry plates 55 and 56 apertured in alinement at 57 and 58 to carry a transverse axle 59 (Figure 3) on which is journaled a single wheel 60 that provides ground-engaging or load-sustaining means for carrying the frame F. The frame F carries upwardly extending supports including longitudinally spaced bearings 61 and 62 alined on a longitudinal axis for pivotally supporting the basket B. These bearings are directly above that portion of the frame structure on which the wheel-supporting structure 53—54 is carried, so that the weight of the basket is appropriately distributed between the wheel 50 and the proximate traction wheel 26, as will be brought out later. The bearing 61 is at the upper end of a triangular structure made up of a vertical tubular member 63, an upwardly and outwardly inclined tubular brace 64 and the outer portion of the front arch 44. The bearing 62 is of similar construction, comprising tubular members 65 and 66 and the outer portion of the rear arch 45. A longitudinal arched member 67 extends between inner portions of the front and rear arches 44 and 45 to provide means for supporting that portion of the basket B adjacent the inner or tractor side of the frame F.

*Mounting of the frame F on tractor T*

As described above, the outer rear portion of the frame F is carried on the load-sustaining element comprising the single wheel 60. The frame is further carried on the tractor T by a pair of longitudinally spaced, front and rear, load-sustaining elements or mounting means, each of which will be presently described. The forward end of the longitudianl support or inner frame element 42 has a laterally inwardly extending arm 68, preferably rigidly secured to the member 42, as by welding, and braced by a gusset 69. The arm 68 is apertured on a longitudinal axis at 70 (Figure 9) to receive a cooperating mounting element in the form of a longitudinally extending stud or pintle 71 mounted on the tractor T by means of the forward extension E. The mounting of the pintle or stud 71 on the forward extension places this part of the mounting means at the extreme forward end of the tractor and thus in a position materially ahead of the location that would be available on the tractor without the extension E. The particular mounting of the pintle or stud 71 on the extension E may be varied to suit individual desires. That shown comprises a bracket 72 to which the pintle or stud is rigidly secured, as by welding. This bracket is rigidly secured to a forward part of the left-hand extension side member 30. Normally, the mounting means comprising the cooperative elements 68 and 71 is enclosed by an appropriate shield 73ª. This shield is provided for the purpose of eliminating tangling of the mounting means with the cotton plants. The shield has been omitted from the view in Figure 4.

The arm 68 on the forward end of the member or element 42 is relatively long and extends tractor-wards to such extent as to dispose the pivot 70—71 relatively close to the longitudinal center line of the tractor. The lever arm 68 is made as long as possible so as to materialy reduce the length of the lever arm between the tractor center line and the point 70—71. In other words, it is important to keep the latter lever arm as short as possible to eliminate or minimize twist about the longitudinal center line of the tractor.

Figures 5, 6, 7:
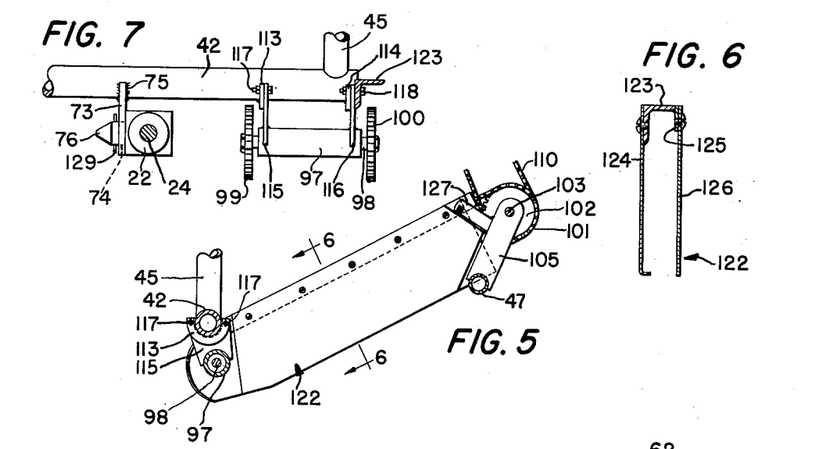
Figure 5 is an enlarged fragmentary sectional view taken substantially on the line 5—5 of Figure 2 and showing a portion of the driving mechanism for the picker.
Figure 6 is a fragmentary sectional view, drawn to an enlarged scale, taken along the line 6—6 of Figure 5.
Figure 7 is a fragmentary side elevational view of the rear portion of the tractor, as viewed along the line 7—7 of Figure 4.

The member or element 42 is provided at its rear end with part of a second mounting means, this part comprising a depending bracket or arm 73 apertured at 74 on a generally longitudinal axis and rigidly secured to the member 42, as by welding at 75 (Figure 7). The other part of the rear mounting means or second load-sustaining element with which the part or arm 73 cooperates comprises a forwardly extending pintle or stud 76 rigidly secured to and extending forwardly from the left-hand rear axle housing 22.

Figure 4:
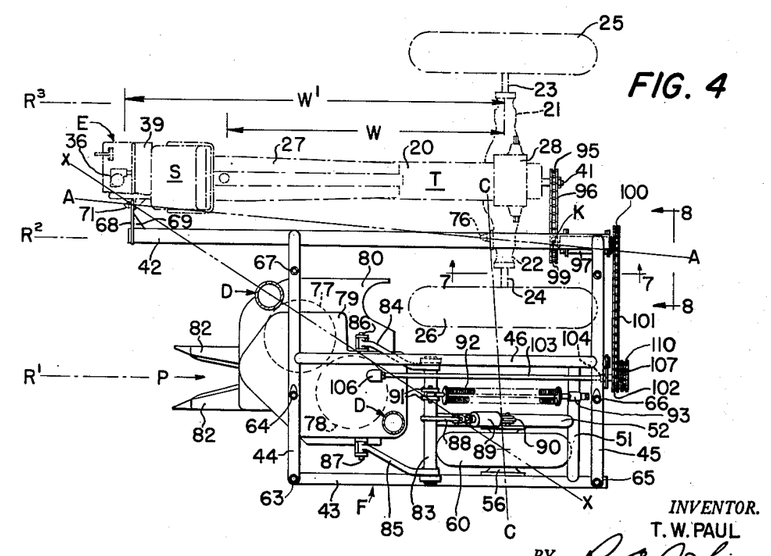
Figure 4 is a plan view, with various components of the superstructure removed so that the view appears to be one taken generally on the line 4—4 of Figure 2, the tractor being shown in broken lines so that the relationship between the tractor and the auxiliary frame may be more readily comprehended.

As best seen in Figure 4, the rear mounting means 73—76 is located substantially intermediate the center line of the tractor and the longitudinal plane of the left-hand traction wheel 26. This mounting means is thus relatively remote from the center line of the tractor, as compared to the relatively close location of the front mounting element 68—71. Hence, the front and rear mounting means or elements lie on the line A—A, which line is non-parallel to or forwardly convergent as respects the longitudinal center line of the tractor.

Because of the forwardly advanced location of the mounting means 68—71 on the tractor body extension E, the distance between the front and rear mounting means is quite long. This distance bears a definite relationship to the distance between the front mounting means and the point of contact between the wheel 60 and the ground. In Figure 4, the line X—X is drawn between the two last mentioned points. The rear mounting means 73—76 is in substantial transverse alinement with the wheel 60. The line C—C in Figure 4 is drawn between the rear mounting means and the point of contact between the wheel 50 and the ground. Thus, the lines A—A, X—X, and C—C, when extended, intersect at the three load-sustaining elements respectively at the apices of the triangle thus formed. The entire frame F and its relationship to the tractor may be considered to be designed about this triangle which, as will hereinafter appear, serves also as the basis for mounting the picker P on the frame F.

*Picking unit and mounting thereof on frame F*

The picking unit may be of any desired construction. That shown is of the type in which cotton is picked by a plurality of rows or series of spindles which operate in orbits to enter and emerge from cotton plants along the row $R^1$. A representative picker is shown in the U. S. Patent to Johnston 2,140,631. This patent shows a pair of laterally spaced, longitudinally offset picker drums which operate at opposite sides of the cotton plants along a row, the spindles entering the plants and being barbed to wind cotton thereon as they rotate. In the present case, the picker drums are shown generally by dotted circles 77 and 78. Since the picker details may vary, only a diagrammatic showing has been resorted to. The relationship of the picker drums 77 and 78 to the row $R^1$ may be readily perceived and will serve to illustrate the general relationship of the picker to the frame F and the structural characteristics involved in so far as concerns the mounting of the picker P on the frame F. The drums 77 and 78 are substantially completely enclosed, except at their inner sides, in a housing made up of an upper or top casting 79 which is secured to a top plate 80. Vertical and longitudinally extending side sheets 81 complete the housing or enclosure. A pair of forwardly extending, laterally spaced dividers 82 provide a throat or entrance to the interior of the unit so that, as the machine travels forwardly along the row, cotton in that row may be engaged by the spindles on the drums 77 and 78. Cotton may be removed from the spindles by any suitable means, such as the doffing means illustrated in the patent referred to above. The cotton, when removed from the spindle, is conveyed to the basket B by the blower means comprising the ducts D and $D^1$ and the fans V. As previously stated, the basket B is pivoted on the basket-supporting bearings 61 and 62 for swinging about a longitudinal horizontal axis so that the contents of the basket may be dumped into a suitable vehicle or other receptacle.

It will be appreciated that the picking unit P is of considerable weight, most of which is concentrated about the drums 77 and 78. The interior driving mechanism for these spindles adds materially to the weight of the unit. Therefore, it is important to carry the unit in its most advantageous location on the frame F, having due regard to the centering of the unit on the row $R^1$ and the distribution of the weight of the unit between the frame F and the tractor T. As will be evident from an examination of Figure 4, the drums 77 and 78 are located in close proximity to the line X—X which extends between the front mounting means 68—71 and a vertical line projected upwardly from the point of contact between the wheel 60 and the ground. The frame F carries a transverse rockshaft 83 from which a pair of arms 84, 85 extend forwardly. These arms are rigidly secured at their rear ends to the rockshaft 83 and are pivotally connected at their forward ends at 86 and 87, respectively, to the picker unit casting 79. The picker unit is thus suspended by the arms 84, 85 through the intermediary of the rockshaft 83 and adjusting or lifting means therefor. This adjusting means may be of any suitable type, that shown comprising a control arm 88 rigidly secured to the rockshaft 83 intermediate its ends and a fluid-pressure motor 89 connected between this arm and an anchor 90 on the frame F. The arm 88, motor 89 and anchor 90 are located in the longitudinal vertical plane of the longitudinal frame member 52. The anchor 90 is rigidly secured to this frame member. A second arm 91 is rigidly secured to the rockshaft 83 inwardly of the lifting arm 88. This arm is secured to the forward end of counterbalancing or assist means comprising a series of longitudinally extending tension springs 92 which are anchored at their rear ends at 93 to the transverse brace 51 of the frame F. Figure 9 shows the anchors 90 and 93 and also shows a pair of transversely alined, apertured brackets 94 for the mounting of the transverse rockshaft 83.

*Picker and fan driving mechanism*

Figure 3:
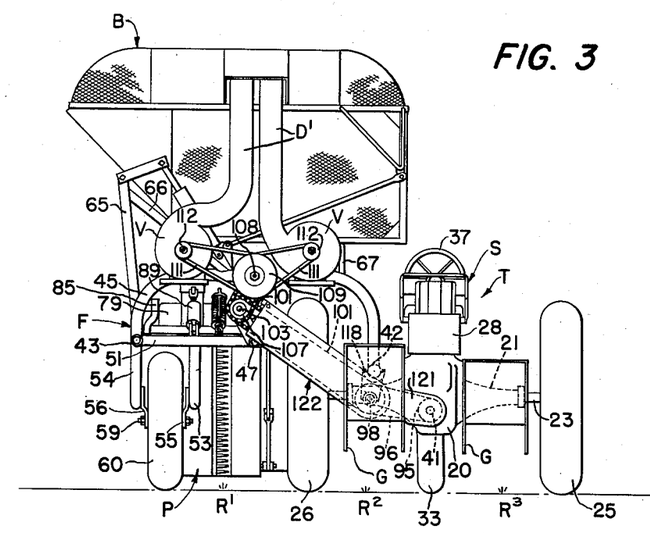
Figure 3 is a rear view of the structure shown in Figures 1 and 2.
Figure 8:
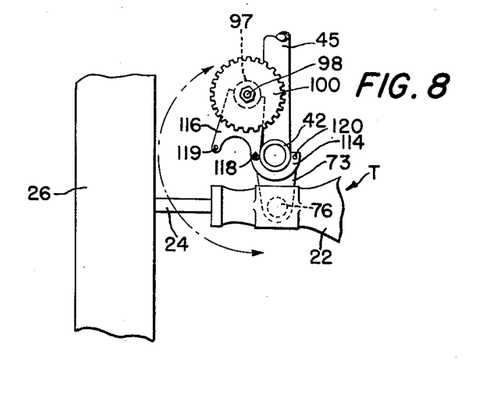
Figure 8 is a fragmentary rear elevational view taken substantially on the line 8—8 of Figure 4 and drawn to the scale of Figures 5 and 7.

As previously described, the tractor includes the rearwardly extending power take-off shaft 41. This shaft provides the initial driving element for the picker and fan driving means. The power take-off shaft has keyed thereto a sprocket or pulley 95 about which is looped a driving chain or belt 96 (Figures 3 and 4). The rear portion of the frame member 42 carries a bearing hanger or bracket 97 which journals a longitudinally extending driven shaft 98 (Figures 5, 7 and 8). The forward end of the shaft 98 has keyed thereto a sprocket or pulley 99 about which is looped the chain or belt 96.

As previously mentioned, the longitudinal pivot axis A—A between the frame F and tractor T is non-parallel as respects the longitudinal center line of the tractor. Ordinarily, such arrangement would give no little difficulty as respects the drive between the power take-off shaft 41 and the driven shaft 98. However, in the present case, the bearing hanger 97 and shaft 98 are so arranged with respect to the frame F and pivot axis A—A as to eliminate any variation in the tension on the chain or belt 96 as the frame F moves vertically with respect to the tractor about the pivot axis A—A. This result is achieved by the disposition of the shaft 98 in such manner that the longitudinal axis thereof intersects the axis A—A at a point that lies in an upright transverse plane passed through the sprockets 95 and 99. Thus, the pivot between the tractor T and frame F, in so far as concerns the driving means 41, 95—99, is at the point K (Figure 4).

The rear end of the driven shaft 98 has keyed thereto a sprocket or pulley 100 from which drive is taken by means of a chain 101 to a sprocket 102 on a longitudinally extending shaft 103. This shaft extends lengthwise of the frame F just outwardly of and below the longitudinal frame member 46 (Figures 1, 2, 3 and 4). The rear end of the shaft is supported in a suitable bearing 104 carried in a bracket 105 rigidly secured to the rear end of the frame member 47 (Figure 9) and the forward end of the shaft enters and is journaled in a gear casing 106 forming part of the picker top casting 79 (Figure 4). Suitable gearing (not shown) is provided within the casting 79 for driving the components of the picker drums 77 and 78.

The shaft 103 carries a second sprocket 107 rearwardly of the sprocket 102. A longitudinal shaft 108 is disposed above the shaft 103 (Figure 3) and has keyed thereto a double pulley 109 and a sprocket (not shown) driven by a chain 110 from the sprocket 107. The double pulley 109 serves by means of belts 111 and pulleys 112 to drive rotors (not shown) within the blowers or fans V.

Apart from the mounting of the bearing hanger 97 and the disposition of the shaft 98 with respect to the longitudinal pivot axis A—A, the particular driving means illustrated forms no part of the invention and could just as well be replaced by another.

*Mounting of bearing hanger 97 and shaft 98*

As best shown in Figures 7, 8 and 9, the rear portion of the member 42 includes a pair of longitudinally spaced supports in the form of arcuate plates 113 and 114. These are rigidly secured to the member 42, preferably by welding. The bearing hanger 97 is substantially of tubular construction and has supporting means comprising front and rear hanger members 115 and 116, these being preferably welded to the tubular portion of the hanger 97. The hanger is normally suspended by means of the brackets 113 and 114 and two pairs of bolts 117 and 118. Certain of these bolts are removable to provide for a shiftable mounting of the hanger 97, as will appear from the following description of the structure with particular reference to Figure 8.

The rear hanger member 116 is provided with inner and outer apertures 119, only the inner of which is visible in Figure 8. The arcuate plate or bracket 114 is likewise provided with inner and outer apertures 120, only the inner of which is visible in Figure 8, the bolt 118 passing through the other of the apertures 120 and the other of the apertures 119. Normally, the remaining apertures 119 and 120 are alined and the other bolt 118 is passed therethrough. This supports the hanger in the position of Figures 5. It will be understood, of course, that the front hanger member and associated bracket 113 are similarly constructed. In its normal position, the hanger 97 depends below the member 42 and rearwardly of the proximate rear axle housing 22. Thus, the axle housing 22 is confined fore and aft between the mounting arm 73 and the hanger 97. In other words, the hanger 97 normally constitutes an obstruction to relative longitudinal movement between the tractor T and frame F necessary to mount or dismount the frame.

As will be apparent from Figure 8, and as will be further described below, the inner bolts 117 and 118 may be removed so that the hanger 97 may be swung upwardly about the longitudinally alined outer bolts 117 and 118. The path of swinging of the hanger and shaft and sprocket assembly is indicated by the double-ended arrow in Figure 8, which shows that the assembly will clear the inner face of the left-hand traction wheel 26. Likewise, the new position of the hanger assembly is such that it clears the axle housing 22.

*Miscellaneous connecting structure, shields and mounting and dismounting of the frame F*

As shown in Figure 3, the initial driving connection comprising the power take-off sprocket 95, chain 96 and driven shaft sprocket 99 are enclosed by appropriate shielding 121. This shielding may be readily removed for accomplishing mounting or dismounting of the frame F. A second shield 122 (Figures 3, 5 and 6) is provided to enclose the drive between the shafts 98 and 103. The construction of this shield is best shown in Figure 6, wherein it will be seen that the shield comprises an elongated stiffening member in the form of an angle bar 123 to the vertical flange of which is secured a sheet metal plate 124. A supporting strip 125 is welded along the free edge of the other flange of the angle bar 123 and carries a sheet metal plate 126, the shield thus having the U-shaped cross sectional appearance. This shield 122 is supported at its inner end by means of the outer of the rear hanger bolts 118 and is supported at its outer end—or end adjacent the shaft 103—by means including a bracket 127 welded to the shaft bracket 105 (see also Figure 9). The reinforced structure of the shield 122 is such that it serves as a compression member between the shafts 98 and 103 to prevent displacement of these shafts because of tension in the drive chain 101.

Figure 10:
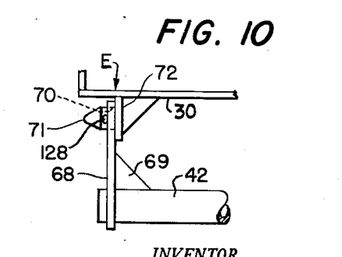
Figure 10 is an enlarged fragmentary plan view showing the forward mounting means or load-sustaining element.

As best shown in Figures 7 and 10, the front and rear mounting means, comprising respectively the components 68—71 and 73—76, are disconnectible between the tractor T and frame F. For this purpose, the front stud or pintle 71 carries a removable pin 128 and the rear stud or pintle 76 carries a removable pin 129. Assuming that the frame is mounted on the tractor and it is desired to remove the frame, the procedure is substantially as follows: The inner longitudinal member 42 is blocked from the ground or otherwise supported so that it will not be displaced vertically when the support of the tractor is removed. Obviously, any support on the member 42 should be ahead of the rear axle housing 22. The outer portion of the frame will, of course, be carried on the wheel 60. Having supported the inner portion of the frame as suggested above, the shield 73a and the pins 128 and 129 may be removed. The power take-off shield 121 is next removed. The exposed power take-off drive chain 96 is also removed.

The shield 122 is disconnected from its supporting portions at 118 and 127 so that the drive chain 101 may be disconnected between the sprockets 100 and 102. The removal of the shield 122 necessitates the removal of the outer of the rear bolts 118; however, this bolt may be immediately replaced to serve as a pivot for the bearing hanger assembly 97. With the shields and chains removed, the inner of the mounting bolts 117 and 118 may be removed and the hanger assembly swung to the position of Figure 8. The tractor may then be driven rearwardly with respect to the frame F.

Remounting of the picker unit and frame on the tractor is just as easily accomplished. Inasmuch as the connections at 68—71 and 73—76 are of the forward drive-in type, the tractor may be driven forwardly into place alongside the supported frame F so that the pintles or studs 71 and 76 respectively enter the apertured arms 68 and 73, after which the pins 128 and 129 are replaced and the driving connections effected and shields installed. The extraneous supporting structure utilized to temporarily support the frame F may be removed and the tractor and frame F are again ready for utilization as a unit.

SUMMARY

As previously mentioned, the relationship between the load-sustaining elements comprising the wheel 60, the means 68—71 and the means 73—76 is important from the standpoint of supporting the picker unit T and basket B. It will be clear from an examination of Figure 4 that the weight of the auxiliary unit is appropriately distributed between the tractor and the carrying wheel 60. The inclination of the pivot axis A—A provides for disposition of the mounting means 68—71 relatively close to the longitudinal center line of the tractor. The forward extension E enables the forward mounting means to be disposed considerably farther forward than would be possible without such extension. Thus, the distance between the inner mounting elements is considerably increased. At the same time, the front mounting means is considerably farther ahead of the load-sustaining element comprising the carrying wheel 60. This arrangement provides for increased elongation of the frame F as respects its ability to carry the picker unit P at a point midway between the front mounting means and the carrying wheel 60. It will be appreciated in this respect that the picker unit P must be disposed directly ahead of the traction wheel 26 and carrying wheel 60. However, there are limitations on the extent to which the picker unit can be so forwardly disposed. For example, a forward disposition of the picker unit considerably ahead of that illustrated would tend to rock the frame F about the axis X—X, this imposing additional load on the front end of the tractor and lightening the load on the proximate traction wheel 26. Now, if the front mounting means were caused to be disposed rearwardly of the seat S, for example, the now longest side of the imaginary triangle whose apices are formed by the mounting elements would be considerably shortened. Therefore, the picker unit would overhang the new axis corresponding to but rearwardly of the axis X—X, thus imposing considerable twist on the frame F and leading to the results mentioned above.

The disposition of the mounting means 73—76 at the point intermediate the tractor center line and the left-hand traction wheel 26 is desirable for many reasons. Obviously, the theoretically perfect load-supporting connection would be on the tractor center line. However, there must be taken into consideration the basic design of the tractor and the desire not to materially alter the tractor. Location of the mounting means at the center of the tractor, as suggested, would interfere, in the particular case illustrated, with the normal seat mounting at 28. Ordinarily, this is of no importance in itself, except that in the case of the presently illustrated tractor, the seat mounting is over power lift or power control mechanism. In any case, such mounting would be directly over the transmission and final drive gearing and would not only require special reenforcing of the gear casing but would also interfere with the normal location of the transmission controls.

Various other features and objects of the invention not specifically enumerated above will undoubtedly occur to those versed in the art, as likewise will numerous modifications and alterations in the preferred construction illustrated, all of which may be achieved without departing from the spirit and scope of the invention as defined in the appended claims.

What is claimed is:

1. For use with a tractor having a longitudinal body carried on front and rear ground-engaging supports and including a longitudinal power shaft on which a drive member may be mounted for rotation in a transverse vertical plane: a secondary frame for mounting on the tractor, comprising a frame element positionable alongside the tractor to extend lengthwise thereof; means at a forward part of the frame element for the mounting thereof on a forward part of the tractor body on a longitudinal pivot; means at a rearward part of the frame element for the mounting thereof on a rear part of the tractor body on a longitudinal pivot; one of said means projecting tractor-wards to a greater extent than does the other so that said pivots lie on a generally horizontal line that is non-parallel to the tractor centerline; a driven shaft journaled on the frame on an axis that is parallel to the axis of the tractor power shaft and that intersects said line through the pivots at a point in the transverse vertical plane of the rotary drive member on the tractor power shaft; and a drive member on the driven shaft rotatable generally in said plane for receiving an endless drive element trained about the power shaft drive member, whereby the secondary frame may pivot about the pivots without varying the tension in such endless drive member.

2. For use with a tractor having a longitudinal body carried at its front end on front wheel means and carried at its rear end on a transverse rear axle structure and widely spaced rear wheels, and including a longitudinal power shaft projecting rearwardly beyond the rear axle structure: an attachment frame unit positionable along one side of the tractor and having ground-engaging means for sustaining said unit in part outside the tractor rear wheel at that side of the tractor, and further including a frame element positionable to extend from front to rear across the rear axle structure and inwardly of the aforementioned rear wheel of the tractor; front and rear mounting means on the frame element and separably connectible respectively to a front part of the tractor body and to the rear axle structure; said rear means being located on the frame element so as to be positionable ahead of the rear axle structure, and both of said means including provision for tractor-unit connection and disconnection respectively by moving the tractor forwardly and rearwardly relative to the unit; and drive means on the frame for connection to the tractor power shaft, including a bearing hanger spaced rearwardly of the rear mounting means and normally extending vertically from the frame element so as to be positioned rearwardly of and in obstructing relation to the rear axle structure as respects tractor-unit connection and disconnection, and means mounting the bearing hanger on the frame element for shifting selectively out of and back to such normal position so that it may be moved to non-obstructing position to accommodate tractor-unit connection and disconnection.

3. An attachment frame for a tractor of the type having a longitudinal body carried on transverse rear axle structure including widely spaced wheels, comprising: an elongated rigid frame member adapted to extend lengthwise of the tractor at one side thereof and inwardly of the rear wheel at that side from the rear axle to a forward part of the tractor and at a level above the rear axle and below the top of said rear wheel; means at a rear portion of the member for sustaining the member on a rear part of the tractor body; means on a forward portion of the member for sustaining the member on a forward part of the tractor body; ground-engaging means positionable outside of and generally in transverse alinement with said one rear wheel; a transverse frame member having inner and outer ends and arching over said one rear wheel; means connecting said inner end to the elongated frame member to accommodate longitudinal passage of said one rear wheel when the tractor and attachment frame are moved longitudinally relative to each other; means connecting said outer end to the ground-engaging means; and means on the attachment frame for supporting a harvesting unit or the like directly ahead of said one rear wheel and the ground-engaging means and located substantially on a line extended from the front mounting means to a vertical line projected upwardly from the area of contact of the ground-engaging means with the ground.

4. An attachment frame for a tractor, comprising: a first elongated inner frame member adapted to extend lengthwise and horizontally alongside the tractor; mounting means on and spaced lengthwise of the first member for connection of said member to the tractor; a second and shorter horizontal frame member spaced outwardly from the first frame member; a third horizontal frame member substantially equal in length to the second frame member and positioned at a level above the first and second members and lying in an upright plane parallel to and between the first and second members; a pair of upwardly arched cross members spaced lengthwise of the members, each connected rigidly at its opposite ends to the first and second members and each connected intermediate its ends to opposite ends of the third member; wheel-carrying means sustained by the frame directly below the second and third members; and load-carrying means sustained by the frame directly above the second and third frame members.

5. The invention defined in claim 4, further characterized in that: the wheel-carrying means includes a fourth horizontal member generally parallel to and intermediate the first and second members and below the third member so as to be spaced outwardly from the first member and below the inner portions of the arched members; and brace means is provided between the fourth member and the second and third members and exclusive of the first member to leave a longitudinal space between the first and fourth members and below the inner portions of the arched members to accommodate fore and aft passage of a wheel of the tractor.

6. An attachement frame for a tractor or the like, comprising: a first elongated frame member adapted to extend lengthwise and horizontally alongside such tractor or the like, including mounting means on said member spaced lengthwise thereof; second and third frame members parallel to and shorter than the first member, the first and second members lying at relatively low levels and the third member being spaced above the level of the first and second members; a pair of arched cross members, each connected rigidly at opposite ends to the first and second members and each connected rigidly intermediate its ends to the third member; a fourth member parallel to and in the same horizontal plane as the second member, vertical braces between said fourth member and the third member, transverse braces between the fourth member and the second member; a fifth parallel member between the second and fourth members and connected at opposite ends respectively to the transverse braces; and wheel-carrying means comprising a pair of transversely spaced members lying respectively in spaced apart, upright longitudinal planes, one of said wheel-carrying members being rigidly connected to and depending from the second member, and the other being rigidly connected to and depending from the fifth member.

7. For a tractor having a rotatable driving member: an attachment for the tractor having means for the connection thereof to the tractor for pivoting relative to the tractor about an axis convergent with respect to the axis of rotation of the tractor driving member; a driven member on the attachment; means journaling the driven member on the attachment for rotation in the plane of rotation of the tractor driving member and about an axis intersecting the convergent pivoting axis in said plane; and power-transmitting means for connecting the driving and driven members.

8. In combination: a first support means; a second support means; means pivotally interconnecting the support means for relative angular movement about an axis; a drive element journaled on the first support means for rotation on an axis convergent relative to the pivot axis and having a drive member rotatable in a plane normal to the journaling axis; a drive element journaled on the second support means for rotation on an axis that is parallel to the first axis of rotation and that intersects the pivot axis in the plane of rotation of the aforesaid drive member; a drive member fixed to the second drive element for rotation in said plane; and power-transmitting means interconnecting the drive members.

9. For use with a tractor of the type having a longitudinal body carried at one end on a transverse axle structure including a pair of transversely spaced wheels: an attachment frame comprising an inner frame element positionable to run lengthwise of the tractor between one side of the tractor body and the wheel at said one side and at a level above the axle structure and below the top of said wheel; an auxiliary wheel positionable in laterally outwardly spaced relation to said tractor wheel; and transverse frame means cross-connecting the inner frame element and the auxiliary wheel and arching upwardly and outwardly from said inner frame element to pass over and then downwardly outwardly of said tractor wheel to a load-sustaining connection with said auxiliary wheel and defining at one end of said attachment frame an opening in the form of an inverted U through which said tractor wheel can pass as the tractor and attachment frame are moved longitudinally relative to each other.

10. The invention defined in claim 9, further characterized in that: said attachment frame has means thereon for supporting an implement, said means including transversely spaced and alined rockshaft bearings positioned on said frame below the arched frame means and laterally outwardly of said tractor wheel so as to lie outwardly of the path of movement of said tractor wheel through said inverted U-shaped opening when the frame and tractor are moved longitudinally relative to each other.

11. The invention defined in claim 9, further characterized in that: said attachment frame has first load-supporting means thereon extending upwardly therefrom at the inner side of the arched frame means so as to lie substantially directly above but clear of said tractor wheel, and second cooperative load-supporting means extending upwardly from said frame substantially directly above the auxiliary wheel.

12. For use with a tractor of the type having a longitudinal body carried at one end on a transverse axle structure including a pair of transversely spaced wheels: an attachment structure comprising an auxiliary wheel positionable in laterally outwardly spaced relation to one of the tractor wheels; a substantially horizontal frame of open rectangular shape as viewed from above, having inner and outer transversely spaced longitudinal members and front and rear longitudinally spaced transverse members; means sustaining said frame via said outer member on the auxiliary wheel, with said front and rear members extending respectively ahead of and behind said one tractor wheel and the inner member running lengthwise of the tractor body between said one tractor wheel and the proximate side of the tractor body; first means on the inner member at one end portion thereof adjacent the transverse member for disconnectibly supporting said frame on the tractor; means extended from the other end portion of the inner member beyond the other transverse member for additionally disconnectibly supporting said frame on the tractor; both of said means providing for separation of the frame and tractor by relative longitudinal movement of said frame and tractor; and one of said transverse members being arched between the inner and outer members and over said one tractor wheel to accommodate said one tractor wheel when the frame and tractor are moved longitudinally relative to each other.

13. A vehicle frame for attachment to and positionable at one side of a tractor of the type having a longitudinal body carried on front wheel means and on a rear axle structure including widely spaced rear wheels, comprising: a unitary generally rectangular structure, as viewed from above, made up of inner and outer fore-and-aft extending members lying generally in a horizontal plane and front and rear cross members, the inner member being elongated forwardly beyond the front cross member and positionable to extend lengthwise of the tractor above the level of the rear axle and intermediate one rear wheel and the proximate side of the body so that the outer member is laterally outwardly of and the front and rear cross members lie respectively forwardly and rearwardly of that rear wheel; wheel means carried by and for sustaining the frame at a point spaced laterally outwardly of the inner frame member and between the front and rear cross members; means at the forward end of the inner member for effecting a removable sustaining connection to a front part of the tractor; means at the rear end of the inner member for effecting a removable sustaining connection to a rear part of the tractor, said front and rear sustaining means each including longitudinally separable elements providing for connection and disconnection of the tractor and frame by relative longitudinal movement of the two; and said rear cross member being disposed so as to provide clearance for the tractor rear wheel to pass thereunder.

14. The invention defined in claim 13, further characterized in that: the frame includes means for supporting a harvester unit or the like below the front cross member and ahead of the frame wheel means, comprising auxiliary supporting structure above the frame wheel means and generally in the horizontal plane of the inner and outer frame members; and certain of the frame members have mounted thereon upwardly extending, longitudinally spaced supporting means for carrying a receptacle above the frame at a level above the rear cross member, said last named means being in substantial longitudinal alinement generally in a longitudinal vertical plane proximate to the frame wheel means.

TALBERT W. PAUL.

REFERENCES CITED

The following references are of record in the file of this patent:

UNITED STATES PATENTS

| Number | Name | Date |
| --- | --- | --- |
| 1,583,915 | Coats | May 11, 1926 |
| 1,657,360 | Keeler | Jan. 24, 1928 |
| 1,799,368 | Hendrickson | Apr. 7, 1931 |
| 2,212,465 | Baldwin | Aug. 20, 1940 |
| 2,335,942 | Hyman | Dec. 7, 1943 |
| 2,371,842 | Pool et al. | Mar. 20, 1945 |
| 2,383,611 | Marcy | Aug. 28, 1945 |
| 2,456,237 | Acton | Dec. 14, 1948 |